(12) United States Patent
Rao et al.

(10) Patent No.: US 8,825,470 B2
(45) Date of Patent: Sep. 2, 2014

(54) SYSTEM AND METHOD OF PROVIDING A RESPONSE WITH A DIFFERENT LANGUAGE FOR A DATA COMMUNICATION PROTOCOL

(75) Inventors: Mallikarjuna Samayamantry Rao, Delray Beach, FL (US); Dennis Kucmerowski, Delray Beach, FL (US)

(73) Assignee: Siemens Enterprise Communications Inc., Boca Raton, FL (US)

( * ) Notice: Subject to any disclaimer, the term of this patent is extended or adjusted under 35 U.S.C. 154(b) by 1788 days.

(21) Appl. No.: 11/904,654

(22) Filed: Sep. 27, 2007

(65) Prior Publication Data

US 2009/0089043 A1  Apr. 2, 2009

(51) Int. Cl.
| | | |
|---|---|---|
| G06F 17/28 | (2006.01) | |
| G06F 17/20 | (2006.01) | |
| G06F 17/27 | (2006.01) | |
| G10L 21/00 | (2013.01) | |
| H04M 11/00 | (2006.01) | |
| H04M 1/64 | (2006.01) | |
| H04M 3/00 | (2006.01) | |

(52) U.S. Cl.
USPC .......... 704/8; 704/2; 704/3; 704/5; 704/7; 704/9; 704/270; 704/270.1; 379/88.05; 379/88.06; 379/88.19; 379/88.21; 379/88.23; 379/88.25; 379/93.01; 379/100.06; 379/142.01; 379/242; 455/403; 455/412.2; 455/414.1; 455/415; 455/423; 455/435.1; 455/463

(58) Field of Classification Search
CPC .............. G06F 17/289; H04L 12/5895; H04L 29/08108; H04L 12/587; H04W 4/12; H04W 88/02; H04M 1/72519; H04M 2203/2061; H04M 2242/12; H04M 2250/58; H04Q 2213/13175; H04Q 2213/13162; H04Q 2213/162
USPC ........ 704/2, 3, 5, 7, 9, 270, 270.1; 379/88.05, 379/88.06, 88.19, 88.21, 88.22, 88.23, 379/88.25, 93.01, 100.06, 142.01, 242; 455/403, 412.2, 414.1, 415, 421, 423, 455/435, 463
See application file for complete search history.

(56) References Cited

U.S. PATENT DOCUMENTS

| | | | | |
|---|---|---|---|---|
| 5,841,852 | A * | 11/1998 | He | 379/207.15 |
| 6,070,072 | A * | 5/2000 | Dorenbosch et al. | 455/423 |
| 6,760,411 | B2 * | 7/2004 | Dybedokken et al. | 379/88.06 |
| 6,961,567 | B1 * | 11/2005 | Kuhn | 455/435.1 |
| 7,221,933 | B2 * | 5/2007 | Sauer et al. | 455/412.1 |
| 7,324,811 | B2 * | 1/2008 | Kaibel et al. | 455/414.2 |
| 7,412,374 | B1 * | 8/2008 | Seiler et al. | 704/8 |
| 7,711,571 | B2 * | 5/2010 | Heiner et al. | 704/277 |

(Continued)

OTHER PUBLICATIONS

Handley, et al.. SIP: Session Intitiation Protocol, Network Working Group, ISI/Columbia U./Caltech/Bell Labs. Feb. 1999.*

*Primary Examiner* — Paras D Shah
(74) *Attorney, Agent, or Firm* — Buchanan Ingersoll & Rooney PC

(57) ABSTRACT

A system and method of providing a response with different language options for a data communication protocol, such as Session Initiation Protocol, are disclosed. For example, data communication is controlled between at least two endpoints. A response code indicative of a condition of the data communication is transmitted to one of the at least two endpoints. The response code is associated with a reason phrase operable to be displayed at the one of the at least two endpoints in a language selected from an option of a plurality of languages.

18 Claims, 3 Drawing Sheets

(56) References Cited

U.S. PATENT DOCUMENTS

| | | | |
|---|---|---|---|
| 7,962,325 B2 * | 6/2011 | Tagata et al. | 704/8 |
| 2003/0135569 A1 * | 7/2003 | Khakoo et al. | 709/206 |
| 2003/0187658 A1 * | 10/2003 | Selin et al. | 704/270.1 |
| 2006/0074629 A1 * | 4/2006 | Chiu et al. | 704/8 |
| 2006/0092917 A1 | 5/2006 | Kucmerowski et al. | |
| 2006/0245418 A1 | 11/2006 | Kucmerowski et al. | |
| 2006/0274678 A1 | 12/2006 | Holloway et al. | |
| 2007/0041540 A1 * | 2/2007 | Shao et al. | 379/142.01 |
| 2007/0124132 A1 * | 5/2007 | Takeuchi | 704/9 |
| 2007/0178918 A1 * | 8/2007 | Shon | 455/466 |
| 2008/0081621 A1 * | 4/2008 | Li | 455/435.1 |
| 2008/0101569 A1 * | 5/2008 | Decker | 379/114.2 |
| 2009/0018816 A1 * | 1/2009 | Noldus et al. | 704/8 |

\* cited by examiner

SYSTEM AND METHOD OF PROVIDING A RESPONSE WITH A DIFFERENT LANGUAGE FOR A DATA COMMUNICATION PROTOCOL

BACKGROUND

The present embodiments relate to data communication.

In a world of computers, cell phones, personal digital assistants ("PDAs"), and the Internet, data communication is a day-to-day endeavor. As technological advancements in data communication occur, more and more infrastructure and/or protocols are utilized to accommodate relatively simple and complex data exchanges. For example, Session Initiation Protocol ("SIP") is utilized for creating, modifying, and terminating data sessions with one or more participants. These sessions include Internet telephone calls, multimedia distribution, and multimedia conferences. For example, SIP is used as a signaling protocol for Voice over Internet Protocol ("VoIP").

SIP communication allows users at SIP endpoints to receive responses in regards to status of the data communication. For example, response codes and/or reason phrases are sent to and displayed at SIP entities. These response codes and reason phrases inform an end user about the data communication for which the end user is engaged or wants to be engaged.

The reason phrases used in SIP communication are in English. A SIP server transmits a response code and a reason phrase in English to a SIP endpoint, and the SIP endpoint displays the response code and the reason phrase.

BRIEF SUMMARY

By way of introduction, the preferred embodiments described below include a data communication protocol system and a method of providing a response in a language other than English and/or with different language options. The system includes a server and an endpoint. The server transmits a response code to the endpoint, and the response code is indicative of a condition of the data communication. A reason phrase corresponding to the response code is displayed at the endpoint in a desired language.

According to a first aspect, a method of providing a response with different language options for a data communication setup protocol is provided. Data communication is controlled between at least two endpoints. A response code indicative of a condition of the data communication is transmitted to one of the at least two endpoints. The response code is associated with a reason phrase operable to be displayed at the one of the at least two endpoints in a language selected from an option of a plurality of languages.

According to a second aspect, a system for providing a response with different language options for Session Initiation Protocol based communication is provided. A server is operable to control data communication between at least two Session Initiation Protocol endpoints. The server is further operable to transmit a reason code indicative of a condition of the data communication to one of the at least two Session Initiation Protocol endpoints. The reason code is associated with a reason phrase operable to be displayed in a language other than English at the one of the at least two Session Initiation Protocol endpoints.

According to a third aspect, a computer-readable medium has stored therein instructions executable by a processor in a system for providing a response with different language options for Session Initiation Protocol based communication. The instructions include receiving a reason code from a Session Initiation Protocol server. A reason phrase associated with the reason code is displayed. The reason phrase is in a selected language from an option of a plurality of languages.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A SIP response is enhanced to provide more information to or at a SIP endpoint. The SIP endpoint can use the additional information to provide a more user friendly experience. For example, along with a reason code, a language identifier is transmitted to the SIP endpoint. As another example, the reason code is transmitted without a language identifier, but the language is identified by another input. The endpoint contains a preconfigured look-up list of reason phrases in a variety of languages. Based on the reason code and language identifier, the endpoint can display a reason phrase from the look-up list in a language desired by the user. In this manner, the user experience at the SIP endpoint is enhanced and improved. Backward compatibility is also provided for because older SIP entities that do not support the use of multiple languages can still be used in the system in their normal fashion.

Figure 1:
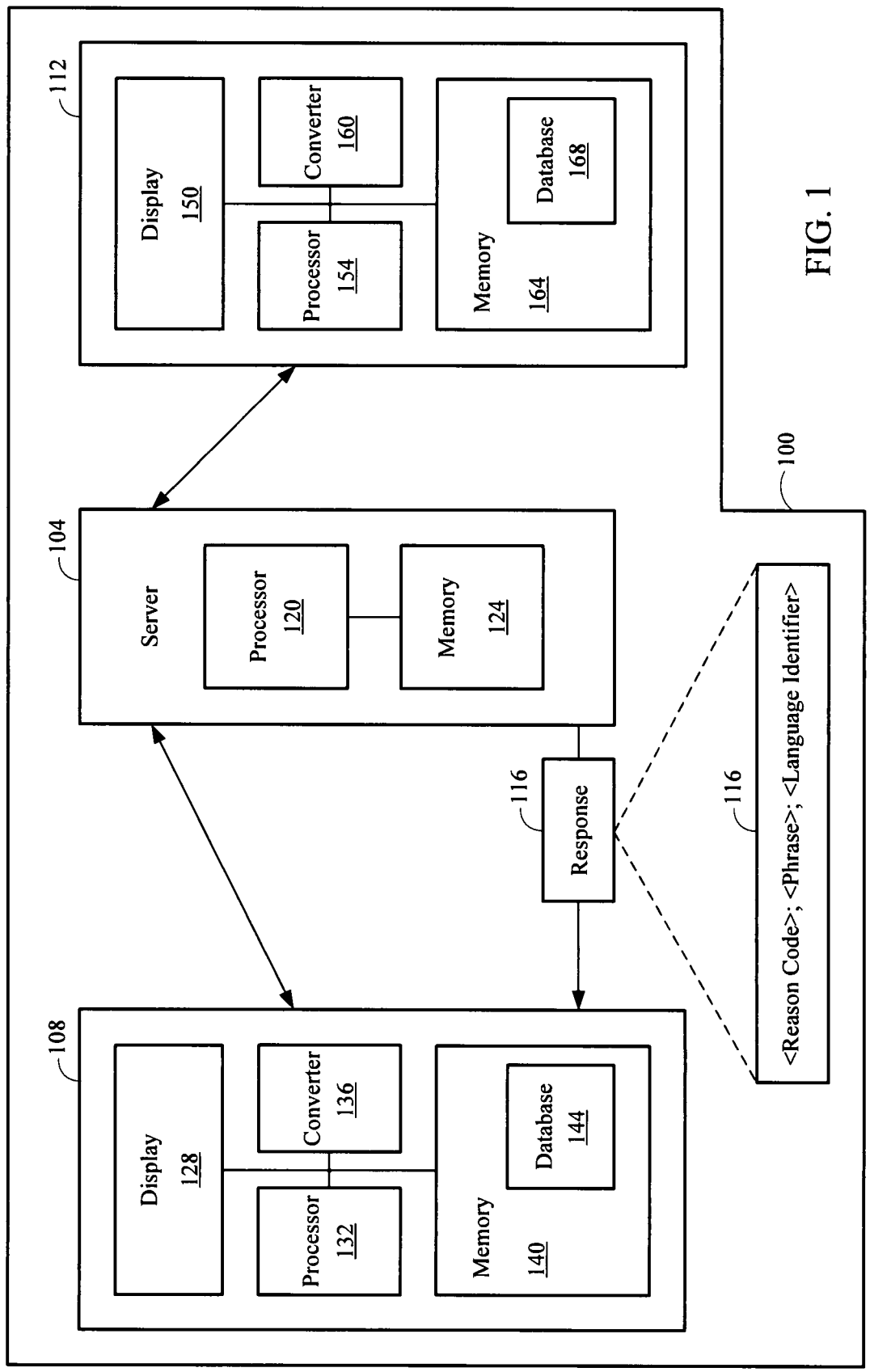
FIG. 1 is a diagram of one embodiment of a data communication system for providing a response with different language options for a data communication protocol.

FIG. 1 shows one embodiment of a data communication system 100 (hereinafter referred to as "system 100"). The system 100 is an Internet protocol based system, such as a VoIP system, a telephony system, a cellular based system, a wireless or wired audio/visual data communication system, or any known or future data communication system utilizing-information exchange for data transfer. For example, the system 100 is an Internet protocol based communication system utilizing SIP. SIP is a signaling or application-layer control protocol for Internet conferencing, telephony, presence, events notification, and instant messaging. SIP was developed within the Internet Engineering Task Force ("IETF").

The system 100 includes, but is not limited to, a server 104 and at least two endpoints 108 and 112. Additional, different, or fewer components may be provided. For example, a proxy server, a billing server, a router, a switch or intelligent switch, a computer or workstation, administrative components, such as an administrative workstation, a gateway device, and network interfaces may be provided. The different components of the system 100 are connected via the Internet, an intranet, a local area network ("LAN"), a wide area network ("WAN"), a virtual private network ("VPN"), and/or any known or future network. Wired and/or wireless connections may be provided.

The server 104 is an application server, communications server, database server, proxy server, file server, web server, client server, peer-to-peer server, and/or any known or future server. For example, the server 104 is a SIP server, such as the HiPath 8000™ server offered by Siemens Corporation. The server 104 is a software and/or hardware implementation. For example, the server 104 is an application program that accepts connections in order to service requests by sending back responses. Alternatively, the server 104 is a server computer or any other hardware that executes and runs server applications.

A hardware implementation of the server 104 includes, but is not limited to, a processor 120 and a memory 124. Additional, different, or fewer components may be provided. The processor 120 is in communication with the memory 124. The processor 120 may be in communication with more or fewer components. The processor 120 is a main processor, such as a microprocessor, or a plurality of processors operable to communicate with electronics of the server 104 or other components of the system 100. The processor 120 is operable to control the various electronics and logic of the server 104 and/or the system 100. The memory 124 is any known or future storage device. The memory 124 is a non-volatile and/or volatile memory, such as a Random Access Memory "RAM" (electronic), a Read-Only Memory "ROM" (electronic), or an Erasable Programmable Read-Only Memory (EPROM or Flash memory).

The endpoints 108 and 112 are in communication with the server 104. The endpoints 108 and 112 are applications, computers, phones, and/or any known or future software or hardware device operable to communicate with a server or each other. For example, the endpoints 108 and 112 are SIP endpoints, such as VoIP optiPoint 410™ phones provided by Siemens Corporation. The endpoint 108 is operable to communicate with the endpoint 112 via the server 104.

The endpoint 108 includes, but is not limited to, a display 128, a processor 132, a converter 136, and a memory 140. Additional, different, or fewer components may be provided. For example, the converter 136 may not be provided. The processor 132 is in communication with the display 128, the converter 136, and the memory 140. The processor 132 may be in communication with more or fewer components. The processor 132 is a main processor, such as a microprocessor, or a plurality of processors operable to communicate with electronics of the endpoint 108. The processor 132 is operable to control the various electronics and logic of the endpoint 108.

The display 128 is any mechanical and/or electronic display positioned for accessible viewing in, on, or in communication with the endpoint 108. For example, the display 128 is a touch screen, liquid crystal display ("LCD"), or a plasma display. The converter 136 is any known or future hardware and/or software language converter operable to convert text in one language to another language. Any known or future conversion logic or software may be utilized. For example, the converter 136 controls input and output of a look-up table. Alternatively, the converter 136 or the functions of the converter 136 are integrated within the processor 132.

The memory 140 is any known or future storage device. The memory 140 is a non-volatile and/or volatile memory, such as a Random Access Memory "RAM" (electronic), a Read-Only Memory "ROM" (electronic), or an Erasable Programmable Read-Only Memory (EPROM or Flash memory). The memory 140 includes a database 144. The database 144 is a look-up-table ("LUT") or any other storage allocation within the memory 140. Alternatively, the database 144 is separate from the memory 140. The database 144 is operable to store reason phrases in a plurality of languages. The languages include, but are not limited to, English, Spanish, Portuguese, Bulgarian, Chinese, Czech, Danish, Dutch, French, Finish, Flemish, Greek, German, Hungarian, Italian, Japanese, Norwegian, Polish, Romanian, Russian, Slovak, Swedish, and Turkish.

The endpoint 112 includes, but is not limited to, a display 150, a processor 154, a converter 160, and a memory 164. Additional, different, or fewer components may be provided. For example, the converter 160 may not be provided. The memory 164 includes a database 168. The display 150, the processor 154, the converter 160, the memory 164, and the database 168 are similar to the display 128, the processor 132, the converter 136, the memory 140, and the database 144 described above. Alternatively, the endpoint 112 may include more, less, or different components than the endpoint 108.

In operation, according to one embodiment, the endpoint 104 attempts to initiate communication with the endpoint 112 using SIP or other protocol. The server exchanges address information of the endpoints 108 and 112 to initiate communication. A response 116 is transmitted from the server 104 to an endpoint, such as the endpoint 108, to inform a user of a status or condition of the data communication. For example, the server 104 is unable to secure data communication between the endpoints 108 and 112 because of insufficient bandwidth. The server 104 transmits the response 116 to the endpoint 108 to inform a user that a connection could not be made due to insufficient bandwidth. Other responses 116 may be provided.

The response 116 includes, but is not limited to, a reason or status code, a reason phrase, and a language identifier. These features are provided in a software header. Additional, different, or fewer features may be provided. For example, the reason phrase and/or the language identifier may not be provided in the response 116. The reason code is a numeric, alphabet, or alpha-numeric code corresponding to the status or condition of the data communication. The reason phrase is a word or a group of words used to explain the status or condition to the user. For example, the reason phrase is a default phrase only in English. Alternatively, the reason phrase is an explanation phrase in a language selected from an option of plurality of languages. The language identifier is a digital sequence, a flag bit, a numeric value, or any other indicator. The language identifier is used to retrieve a reason phrase in a selected language stored in an endpoint. Alternatively, the language identifier is used for converting the reason phrase provided by the server 104 to a desired language.

The following table is an example of some reason codes and phrases:

| Reason Code | Reason Phrase |
|---|---|
| 200 | "Call Completed Elsewhere" |
| 402 | "Payment Required" |
| 580 | "Precondition Failure" |
| 600 | "Busy Everywhere" |
| 606 | "Not Acceptable" |

The reason phrases in the table are transmitted by the server 104 with the reason codes or are stored in an endpoint, such as the endpoint 108 and/or 112. In ones embodiment, the reason codes are SIP reason codes. The reason phrases in the table are in English, but the same or similar reason phrases in a plurality of languages, such as the languages discussed above, are provided. For example, the reason phrases in English are associated with a language identifier with a value of 1, and the same or similar reason phrases in German or other language are associated with a language identifier with a value of 2. The reason phrases are default phrases or can be modified to provide more detailed information to a user. A formal way to define a new reason code that can be used industry wide is to define it as part of a new IETF draft and then get the draft accepted into a Request For Comments ("RFC") by the IETF.

Figure 2:
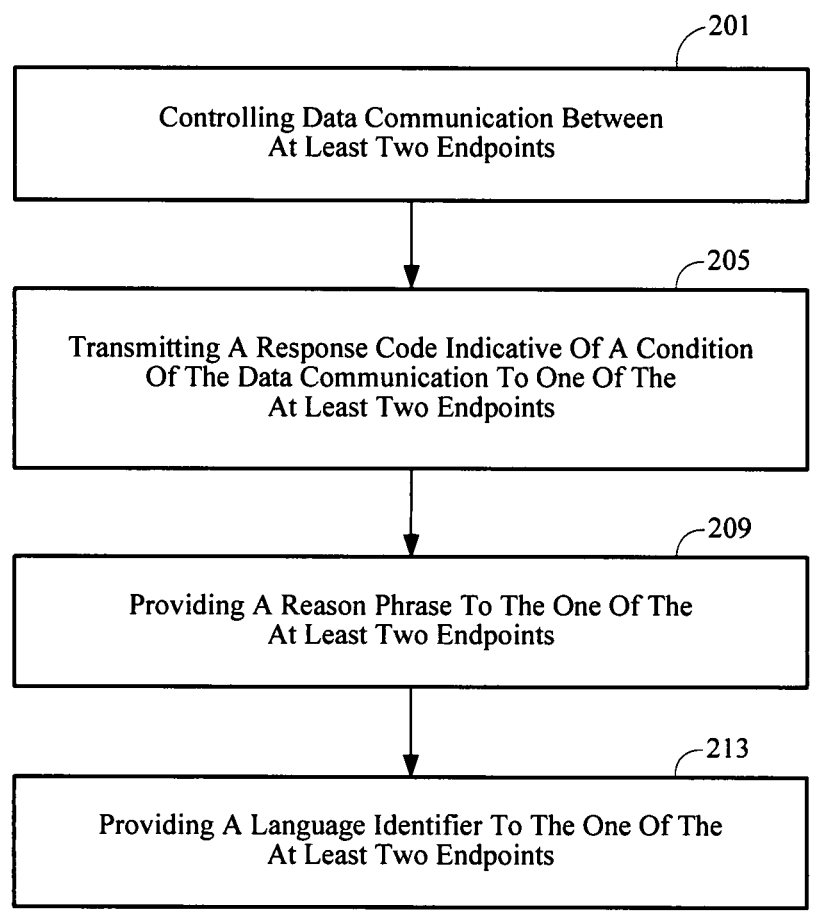
FIG. 2 is a flowchart of one embodiment of a method of providing a response with different language options for a data communication protocol.

FIG. 2 is a flowchart of one embodiment of a method of providing a response with different language options for a data communication setup protocol, such as SIP. Fewer or more acts may be provided. In act 201, data communication is controlled between at least two endpoints, such as the endpoints 108 and 112. For example, a server, such as the server 104, controls data communication between the endpoints. Controlling the data communication includes, but is not limited to, initiating, modifying, filtering, maintaining, and/or terminating the data communication between the endpoints. For example, a first endpoint is a VoIP phone, and a user of the first endpoint attempts to call a user of a second endpoint, which is also a VoIP phone. The server exchanges addresses between the endpoints to initiate a data connection between the users.

In act 205, a response code indicative of a condition of the data communication, such as the reason code described above, is transmitted, such as by a server, to one of the at least two endpoints. The condition is a status, type, or feature of activity that is occurring, has occurred, or may occur in regards to the data communication. For example, if the server is unable to connect the two endpoints discussed in act 201 because of insufficient bandwidth, the insufficient bandwidth is a condition of the data communication. A response code indicative of insufficient bandwidth is transmitted to the endpoint that was attempting to make the connection. Therefore, the user of the endpoint is made aware of the present situation.

In act 209, a reason phrase, such as the reason phrase discussed above, is provided to the endpoint that the reason code was transmitted to in act 205. The reason phrase is operable to be displayed at the endpoint in a language selected from an option of a plurality of languages, such as the languages stored in the database 144 or 168. In one embodiment, a server, such as the server 104, transmits reason phrases in the plurality of languages to the endpoint to be stored in a database, such as the database 144 or 168. Therefore, when the endpoint receives a reason code, a reason phrase in a selected language (selection of a language is described in more detail below in regards to FIG. 3) associated with the reason code is retrieved from the database. The server automatically or via administrative command updates the database periodically or continuously. Alternatively, reason phrases in the plurality of languages are stored in the database by a user, a manufacturer of the endpoint, a vendor of software used in the endpoint, and/or a third party.

In another embodiment, the reason phrase in a selected language is transmitted by a server to the endpoint in conjunction with the reason code. For example, instead of looking up a reason phrase from a database in the endpoint, the reason phrase in the selected language is sent to the endpoint. The reason phrase is sent simultaneously with the reason code in one response, such as the response 116. Alternatively, the reason phrase is sent after a delay or upon request from the user. For example, a user views a reason code and is given the option to view a reason phrase explaining the reason code. If the user selects the option of the reason phrase, then the reason phrase is transmitted to the endpoint, or the endpoint has already received the reason phrase and the actual displaying of the reason phrase is a separate or delayed action.

In act 213, a language identifier, such as the language identifier discussed above, is provided to the endpoint by the server. For example, the language identifier is transmitted with, before, or after the reason code. The language identifier corresponds to a default language of the reason phrase. The reason phrase may be a default phrase in a language, such as English. The language identifier is used by the endpoint to determine what language the reason phrase is in. For example, the endpoint is configured to associate a numeric value to a respective language. Therefore, when the endpoint receives the language identifier with a numeric value, the endpoint will know what language the reason phrase is in. Based on the knowledge of what language the reason phrase is in, the endpoint converts the reason phrase into a phrase in a selected language. The conversion can be accomplished via a converter, such as the converter 136 or 160, or any known or future language conversion technique. Alternatively, the conversion is accomplished without the use of a language identifier. The language identifier may be assumed or set to a default.

In another embodiment, the language identifier is used to retrieve a reason phrase in a selected language from a database in an endpoint. For example, one value of the language identifier is associated with a reason phrase in one language, such as English, and another value of the language identifier is associated with a reason phrase in another language, such as German. When the endpoint receives the language identifier, the reason phrase in the language corresponding to the value of the language identifier is retrieved from a database, such as the database 144 and 168. For example, the endpoint receives the language identifier. A LUT is indexed via reason code values and language identifier values. The endpoint searches the LUT using the received reason code and the language identifier, and the endpoint retrieves the reason phrase in the selected language, such as other than English, from the LUT to display the reason phrase to the user. Alternatively, the reason phrase in a selected language is retrieved based on the reason code only, not the language identifier. For example, the reason code itself contains an indicator that specifies a language, or a separate reason code is used for each reason phrase in all or some of the available languages.

Figure 3:
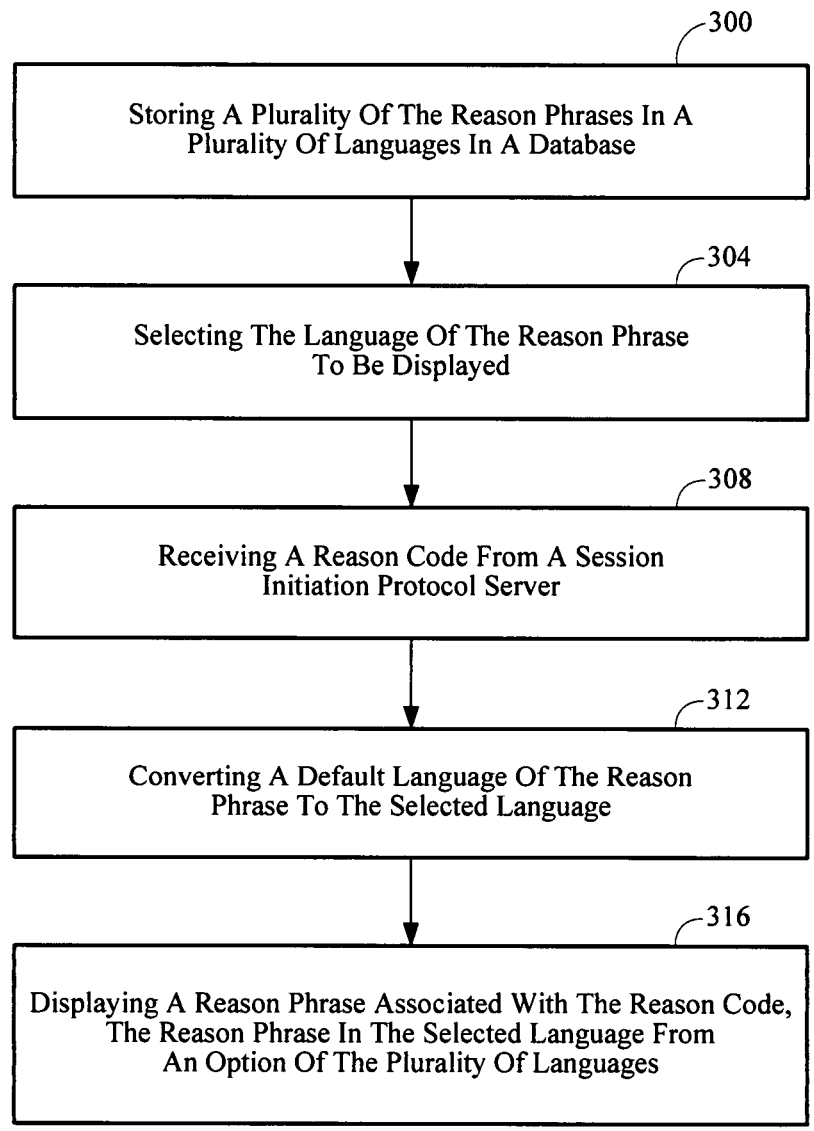
FIG. 3 is a flowchart of one embodiment of instructions that can be executable by a processor of the data communication system of FIG. 1.

The system 100 includes instructions that can be executable by a processor, such as the processor 120, 132, and/or 154. The instructions are stored in a computer-readable medium. The instructions implement the methods, acts, and processes of the system 100. For example, FIG. 3 is a flowchart of one embodiment of instructions that can be executable by a processor, such as the processor 132 or 154, of the system 100. In act 300, a plurality of reason phrases in a plurality of languages are stored in the database. An endpoint, such as the endpoint 108 or 112, stores the reason phrases in a database, such as the database 144 or 168. The reason phrases are provided to the endpoint in any manner discussed in act 209.

In act 304, the language of the reason phrase to be displayed is selected. For example, a user of the endpoint programs or selects an option for a language at the endpoint. This can be accomplished by key sequences, a graphics user interface ("GUI"), or any known or future input. The endpoint will be setup to retrieve a reason phrase in the selected language or convert a reason phrase into the selected language. For example, when a user configures the endpoint for a selected language, a flag bit or mode selector is executed via software and/or hardware logic so that the endpoint retrieves reason phrases in the selected language or converts received phrases into the selected language. The flag bit or mode selector can be a language identifier, such as the language identifier discussed above, of a plurality of language identifiers stored in the endpoint.

Alternatively, when the user selects a language option at the endpoint, the endpoint sends a signal to a server, such as the server 104, informing the server of the language selection. In this way, the server will transmit a reason phrase in the selected language and/or a language identifier used to retrieve a reason phrase in the selected language. The signal may be sent at the time of configuration of the language selection, when data communication is attempting to be initiated, or anytime during or after receiving a reason code. In another embodiment, the user contacts an administrator or the entity controlling the server and requests a specific language to be displayed. Alternatively, the selection of the language is made by the server based on the geographic location of the server, an administrator configuration, and/or the endpoint that will receive the reason code.

In act 308, a reason code, as described above, is received from a server, such as the server 104 and/or a SIP server, or another endpoint. For example, the reason code is transmitted to an endpoint, such as the endpoint 108 or 112, in any manner described in act 205. The endpoint receives the reason code via data communication lines, a bus, infrared ("IR"), a fiber optic cable, an antenna, wireless or wired receiver circuitry, and/or any other known or future data communication path or medium. Based on the reason code and a selected language, a reason phrase in the selected language is retrieved from a database in the endpoint, as described above. Or, a language identifier may be received at the endpoint along with the reason code. The language identifier is used in conjunction with the reason code to retrieve the reason phrase in the selected language, as described above.

Alternatively, a reason phrase, such as a default phrase, is received at the endpoint along with the reason code and/or the language identifier. The phrase may be received instead of the reason code in other embodiments. In act 312, a default language of the reason phrase is converted to the selected language. For example, the conversion takes place at the endpoint via a converter, such as the converter 136 or 160, or conversion logic. Any known or future techniques, circuits, methods, equations, or calculations are used to convert a reason phrase from one language to another selected language. The conversion may be based or not based on the language identifier.

Also, in the system 100, a default phrase may be provided to all or some endpoints that utilize databases of stored reason phrases. This is to provide for backward compatibility. For example, a server provides at least a reason code and a default phrase to an endpoint. Based on at least the reason code, the endpoint retrieves a reason phrase in a selected language from a database. The endpoint is operable to display both the default phrase and the reason phrase from the database, or the endpoint is operable or can be configured to display only the reason phrase from the database. However, if the endpoint does not have a database of stored reason phrases in a plurality of languages or cannot convert the default phrase, the endpoint is still operable to display the default phrase in normal fashion.

In act 316, the reason phrase associated with the reason code is displayed. The displayed reason phrase is in the selected language, such as other than English, from an option of the plurality of languages, as discussed above. The reason phrase is displayed at the endpoint via a display, such as the display 128 or 150. A user of the endpoint is informed and may contact an administrator or another entity to resolve problems with the system based on feedback information of the reason phrase.

The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

Any of the devices, features, methods, and/or techniques described may be mixed and matched to create different systems and methodologies. The features and methods discussed above in the embodiments represent a half-call model in which there is a server between two endpoints. Alternatively, some or all of the features and methods may be utilized between multiple servers and/or between endpoints without intervening servers. For example, a response received at one endpoint may be directly transmitted from that endpoint to another endpoint. Also, different billing techniques and administrative controls may be utilized. For example, a user is billed for receiving reason phrases in a desired or selected language. An administrator may view or receive updates in regards to endpoint or server activity and/or responses to the endpoints at a delayed time or in substantially real time.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended define the spirit and scope of this invention.

We claim:

1. A method of providing a response with different language options for a data communication setup protocol, the method comprising:

transmitting at least one reason phrase in a first language to an endpoint from a server, the first language being a default language;

the server transmitting a language identifier to the endpoint prior to the transmitting of the at least one reason phrase, with the transmitting of the at least one reason phrase, or following the transmitting of the at least one reason phrase;

the server transmitting at least one reason code prior to the transmitting of the at least one reason phrase, with the transmitting of the at least one reason phrase, or following the transmitting of the at least one reason phrase;

the endpoint converting the at least one reason phrase to a selected language of a plurality of languages based on the at least one reason code and the language identifier, the selected language being different than the first language; and the endpoint displaying the at least one reason phrase in the selected language; and wherein the at least one reason phrase is associated with a status of a data communication.

2. The method of claim 1, wherein transmitting the at least one reason phrase in a first language comprises transmitting the at least one reason phrase following initiation of a Session Initiation Protocol (SIP) call and transmitting the language identifier comprises transmitting the language identifier following initiation of the SIP call.

3. The method of claim 1 wherein the at least one reason phrase comprises a plurality of Session Initiation Protocol (SIP) reason phrases, and wherein the plurality of SIP reason phrases are stored in a database, the database being stored in the endpoint or the server.

4. The method of claim 1 wherein the language identifier is transmitted before or after the at least one reason phrase.

5. The method of claim 1, wherein the endpoint has a graphical user interface that allows a user to select an option for the selected language for displaying the at least one reason phrase.

6. The method of claim 1, wherein the endpoint converting the at least one reason phrase to the selected language of the plurality of languages based on the language identifier comprises the endpoint comparing the language identifier to the selected language and if the language identifier and the selected language does correspond, the endpoint retrieving the at least one reason phrase in the selected language from a database comprising a plurality of reason phrases in the plurality of languages.

7. A system for providing a response with different language options for Session Initiation Protocol (SIP) based communication, the system comprising:

an endpoint having a display, a data convertor, and a non-transitory computer readable medium; and a server; and the server transmitting at least one reason phrase to the endpoint, the endpoint storing the at least one reason phrase in the non-transitory computer readable medium;

the server transmitting a language identifier prior to the transmitting of the at least one reason phrase, with the transmitting of the at least one reason phrase, or following the transmitting of the at least one reason phrase;

the server transmitting at least one reason code prior to the transmitting of the at least one reason phrase, with the transmitting of the at least one reason phrase, or following the transmitting of the at least one reason phrase;

the at least one reason phrase having a default language and the at least one reason phrase being associated with a status of a data communication; and wherein the endpoint converts the at least one reason phrase into a selected language of a plurality of languages based on the at least one reason code and the language identifier via the data convertor, the selected language being a language that is different from the default language of the at least one reason phrase; and wherein the endpoint displays the converted at least one reason phrase on the display.

8. The system of claim 7, wherein the server transmits the at least one reason phrase in the first language and transmits the language identifier following initiation of an SIP call.

9. The system of claim 7, wherein the endpoint has a graphical user interface that allows a user to select an option for the selected language for converting and displaying the at least one reason phrase.

10. The system of claim 7, wherein the at least one reason phrase comprises a plurality of SIP reason phrases and wherein the plurality of SIP reason phrases are stored in a database, the database being stored on an endpoint or a server.

11. The system of claim 7 wherein the endpoint converts the at least one reason phrase to the selected language of the plurality of languages based on the language identifier by comparing the language identifier to the selected language and if the language identifier and the selected language does correspond, the endpoint retrieves the at least one reason phrase in the selected language from a database comprising a plurality of reason phrases in the plurality of languages.

12. The system of claim 7, wherein the at least one reason phrase comprises a plurality of SIP reason phrases and wherein the plurality of SIP reason phrases are stored in a database, the database being stored in the endpoint, and wherein the plurality of SIP reason phrases stored in the database are periodically updated.

13. A method for communicating in accordance with a data communication protocol, the method comprising:

storing a plurality of Session Initiation Protocol (SIP) reason phrases in a database, the database stored in a non-transitory computer readable medium, the plurality of SIP reason phrases being associated with a plurality of SIP reason codes, and the plurality of SIP reason phrases having a plurality of languages;

selecting a language of a plurality of languages at an SIP endpoint for display of at least one received SIP reason phrase at the SIP endpoint, the at least one received SIP reason phrase having a default language;

a SIP server transmitting at least one SIP reason code to the endpoint, the at least one SIP reason code being associated with at least one SIP reason phrase stored in the database, the SIP server transmitting the at least one SIP reason code prior to transmitting at least one SIP reason phrase to the SIP endpoint, with the transmitting of the at least one SIP reason phrase to the SIP endpoint, or following the transmitting of the at least one SIP reason phrase to the SIP endpoint;

converting the at least one SIP reason phrase associated with the at least one SIP reason code from the default language to the selected language at the SIP endpoint based on the at least one SIP reason code, the converting step comprising the SIP endpoint retrieving a first SIP reason phrase of the plurality of SIP reason phrases from the database that is associated with the at least one SIP reason code and being in the selected language; and displaying the retrieved first SIP reason phrase in the selected language at the SIP endpoint.

14. The method of claim 13 wherein the database is located in the SIP endpoint or the SIP server.

15. The method of claim 13 wherein the SIP server transmitting the at least one SIP reason code comprises the SIP server transmitting the at least one SIP reason code following initiation of a SIP call.

16. The method of claim 13 wherein displaying the first SIP reason phrase in the selected language is performed at an SIP endpoint and wherein selecting the language of the plurality of languages for display of the at least one received SIP reason phrase comprises the SIP server selecting the language at the SIP endpoint for display based on a location of the SIP endpoint.

17. The method of claim 13 further comprising the SIP server transmitting a language identifier prior to, when or following the server sending of at least one received SIP reason code to the endpoint, the language identifier identifying a language of at least one SIP reason phrase associated with the at least one SIP reason code.

18. The method of claim 17 wherein the language identifier is sent after or before the at least one received SIP reason code.

\* \* \* \* \*